(12) United States Patent
Cudak et al.

(10) Patent No.: US 12,170,072 B2
(45) Date of Patent: Dec. 17, 2024

(54) SYSTEM AND METHOD FOR AUTO SWITCHING VIDEO BY SYSTEM EVENTS

(71) Applicant: Lenovo Enterprise Solutions (Singapore) Pte. Ltd., New Tech Park (SG)

(72) Inventors: Gary D Cudak, Raleigh, NC (US); Mehul Shah, Austin, TX (US); Pravin S Patel, Cary, NC (US); James Parsonese, Cary, NC (US)

(73) Assignee: Lenovo Enterprise Solutions (Singapore) Pte. Ltd., New Tech Park (SG)

(*) Notice: Subject to any disclaimer, the term of this patent is extended or adjusted under 35 U.S.C. 154(b) by 0 days.

(21) Appl. No.: 18/129,460

(22) Filed: Mar. 31, 2023

(65) Prior Publication Data

US 2024/0331657 A1    Oct. 3, 2024

(51) Int. Cl.
 G09G 5/00   (2006.01)
 G06F 3/14   (2006.01)

(52) U.S. Cl.
 CPC ............... *G09G 5/006* (2013.01); *G06F 3/14* (2013.01)

(58) Field of Classification Search
 CPC ........ G09G 5/006; G06F 3/14; G06F 13/4022
 See application file for complete search history.

(56) References Cited

U.S. PATENT DOCUMENTS

| | | | |
|---|---|---|---|
| 6,557,170 B1 | 4/2003 | Wilder et al. | |
| 7,581,125 B2 | 8/2009 | Ranganathan | |
| 9,250,684 B1 | 2/2016 | Chen | |
| 2003/0110205 A1 | 6/2003 | Johnson | |
| 2004/0075638 A1* | 4/2004 | Han | G06F 3/023 345/156 |
| 2006/0238526 A1* | 10/2006 | Kim | G09G 5/006 345/204 |
| 2007/0257883 A1* | 11/2007 | Ke | G06F 3/0227 345/157 |
| 2008/0024433 A1* | 1/2008 | Gunther | G09G 5/006 345/156 |
| 2010/0242038 A1* | 9/2010 | Berrange | G06F 21/445 718/1 |
| 2015/0089308 A1* | 3/2015 | Angaluri | G06F 11/0709 714/57 |

(Continued)

OTHER PUBLICATIONS

U.S. Appl. No. 18/087,150, filed Dec. 22, 2022, Non-Final Office Action mailed Jan. 5, 2024, pp. 1-15.

(Continued)

*Primary Examiner* — Stephen G Sherman
(74) *Attorney, Agent, or Firm* — Kunzler Bean & Adamson; Bruce R. Needham (57) ABSTRACT

A method for automatically switching input/output ("I/O") between partitioned systems based on system events includes monitoring a system state for each of two or more systems sharing an electronic display, where each of the two or more systems includes a processor executing an instance of an operating system, selecting a system of the two or more systems sharing the electronic display in response to determining that a change has occurred in the system state of the of the selected system, and switching an input of an I/O switch to send data for display of one or more elements of the selected system to the electronic display.

20 Claims, 6 Drawing Sheets

(56) References Cited

U.S. PATENT DOCUMENTS

2023/0334155 A1   10/2023   Zhang et al.
2023/0334184 A1*  10/2023   Zhang .................. G06F 21/755

OTHER PUBLICATIONS

U.S. Appl. No. 18/087,150, filed Dec. 22, 2022, Final Office Action mailed May 9, 2024 pp. 1-21.
U.S. Appl. No. 18/087,150, filed Dec. 22, 2022, Notice of Allowance mailed Aug. 8, 2024 pp. 1-10.

* cited by examiner

SYSTEM AND METHOD FOR AUTO SWITCHING VIDEO BY SYSTEM EVENTS

FIELD

The subject matter disclosed herein relates to input/output switching and more particularly relates to automatically switching input/output between partitioned systems based on system events.

BACKGROUND

Often a system administrator or other user may want to monitor multiple systems, such as partitioned systems, from a single electronic display and to control a selected system with a keyboard, mouse, or other input/output device.

BRIEF SUMMARY

A method for automatically switching input/output ("I/O") between partitioned systems based on system events is disclosed. An apparatus and computer program product also perform the functions of the method. The method includes monitoring a system state for each of two or more systems sharing an electronic display, where each of the two or more systems includes a processor executing an instance of an operating system, selecting a system of the two or more systems sharing the electronic display in response to determining that a change has occurred in the system state of the of the selected system, and switching an input of an I/O switch to send data for display of one or more elements of the selected system to the electronic display.

An apparatus for automatically switching I/O between partitioned systems based on system events includes an event monitor module configured to monitor a system state for each of two or more systems sharing an electronic display, where each of the two or more systems includes a processor executing an instance of an operating system, a selection module configured to select a system of the two or more systems sharing the electronic display in response to determining that a change has occurred in the system state of the of the selected system, and an I/O switch configured to switch an input of the I/O switch to send data for display of one or more elements of the selected system to the electronic display.

A compute node for automatically switching I/O between partitioned systems based on system events includes two or more systems sharing an electronic display and an I/O device. Each of the two or more systems includes a processor executing an instance of an operating system and the compute node is partitioned into the two or more systems. The compute node includes an event monitor module configured to monitor a system state for each of the two or more systems sharing an electronic display, a selection module configured to select a system of the two or more systems sharing the electronic display in response to determining that a change has occurred in the system state of the of the selected system, and a KVM switch configured to switch an input of the KVM switch to send data for display of one or more elements of the selected system to the electronic display and to connect an I/O controller receiving data from the I/O device to the selected system.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices, in some embodiments, are tangible, non-transitory, and/or non-transmission.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" or "one of A, B, or C" includes only A, only B or only C and excludes combinations of A, B and C.

A method for automatically switching input/output ("I/O") between partitioned systems based on system events is disclosed. An apparatus and computer program product also perform the functions of the method. The method includes monitoring a system state for each of two or more systems sharing an electronic display, where each of the two or more systems includes a processor executing an instance of an operating system, selecting a system of the two or more systems sharing the electronic display in response to determining that a change has occurred in the system state of the of the selected system, and switching an input of an I/O switch to send data for display of one or more elements of the selected system to the electronic display.

In some embodiments, determining the change in the system state of the selected system includes receiving a notification of the change of the system state. In other embodiments, notification includes a notification of a predicted failure of a hardware component in the selected system, a notification of a failure of a hardware component of the selected system, a notification of an input/output error associated with input/output signals of the selected system, a notification of a processing error associated with a processor of the selected system, and/or a notification of a crossing of a threshold where the crossing of the threshold is indicative of a problem within the selected system.

In some embodiments, monitoring the system state for each of the two or more systems sharing the electronic display includes monitoring the system state using firmware running on each of the two or more systems, and/or a management controller of a compute node. The management controller is connected to a management server over a management network. In other embodiments, monitoring the system state for each of the two or more systems sharing the electronic display includes monitoring one or more executing workloads on each of the two or more systems, a portion of each of the two or more systems, and/or one or more components of each of the two or more systems. In other embodiments, the two or more systems are on a compute node and the compute node is partitioned into the two or more systems.

In some embodiments, the I/O switch includes a keyboard, video, and mouse ("KVM") switch in a management controller of a compute node and the management controller is connected to a management server over a management network. In other embodiments, the management controller includes datacenter-ready secure control module ("DC-SCM"). In other embodiments, monitoring the system state for each of the two or more systems sharing the electronic display excludes a startup period of the I/O switch that includes the I/O switch selecting an initial system of the two or more systems to send data for display.

An apparatus for automatically switching I/O between partitioned systems based on system events includes an event monitor module configured to monitor a system state for each of two or more systems sharing an electronic display, where each of the two or more systems includes a processor executing an instance of an operating system, a selection module configured to select a system of the two or more systems sharing the electronic display in response to determining that a change has occurred in the system state of the of the selected system, and an I/O switch configured to switch an input of the I/O switch to send data for display of one or more elements of the selected system to the electronic display.

In some embodiments, determining the change in the system state of the selected system includes receiving a notification of the change of the system state. In some embodiments, the notification includes a notification of a predicted failure of a hardware component in the selected system, a notification of a failure of a hardware component of the selected system, a notification of an input/output error associated with input/output signals of the selected system, a notification of a processing error associated with a processor of the selected system, and a notification of a crossing of a threshold. The crossing of the threshold is indicative of a problem within the selected system. In other embodiments, the event monitor module monitoring the system state for each of the two or more systems sharing the electronic display includes monitoring the system state using firmware running on each of the two or more systems, and/or a management controller of a compute node. The management controller is connected to a management server over a management network.

In some embodiments, monitoring the system state for each of the two or more systems sharing the electronic display includes monitoring one or more executing workloads on each of the two or more systems, a portion of each of the two or more systems, and/or one or more components of each of the two or more systems. In some embodiments, the two or more systems are on a compute node and the compute node is partitioned into the two or more systems. In other embodiments, the I/O switch includes a KVM switch and/or is in a management controller of a compute node. The management controller is connected to a management server over a management network. In other embodiments, the management controller includes a DC-SCM. In other embodiments, the apparatus includes two or more I/O switches, where a first I/O switch is configured to send the display of the one or more elements of the selected system to the electronic display, and/or a second I/O switch is configured to connect an I/O controller receiving data from an I/O device to the selected system. In other embodiments, monitoring the system state for each of the two or more systems sharing the electronic display excludes a startup period of the I/O switch with the I/O switch selecting an initial system of the two or more systems to send data for display.

A compute node for automatically switching I/O between partitioned systems based on system events includes two or more systems sharing an electronic display and an I/O device. Each of the two or more systems includes a processor executing an instance of an operating system and the compute node is partitioned into the two or more systems. The compute node includes an event monitor module configured to monitor a system state for each of the two or more systems sharing an electronic display and the I/O device, a selection module configured to select a system of the two or more systems sharing the electronic display in response to determining that a change has occurred in the system state of the of the selected system, and a KVM switch configured to switch an input of the KVM switch to send data for display of one or more elements of the selected system to the electronic display and to connect an I/O controller receiving data from the I/O device to the selected system.

Figure 1:
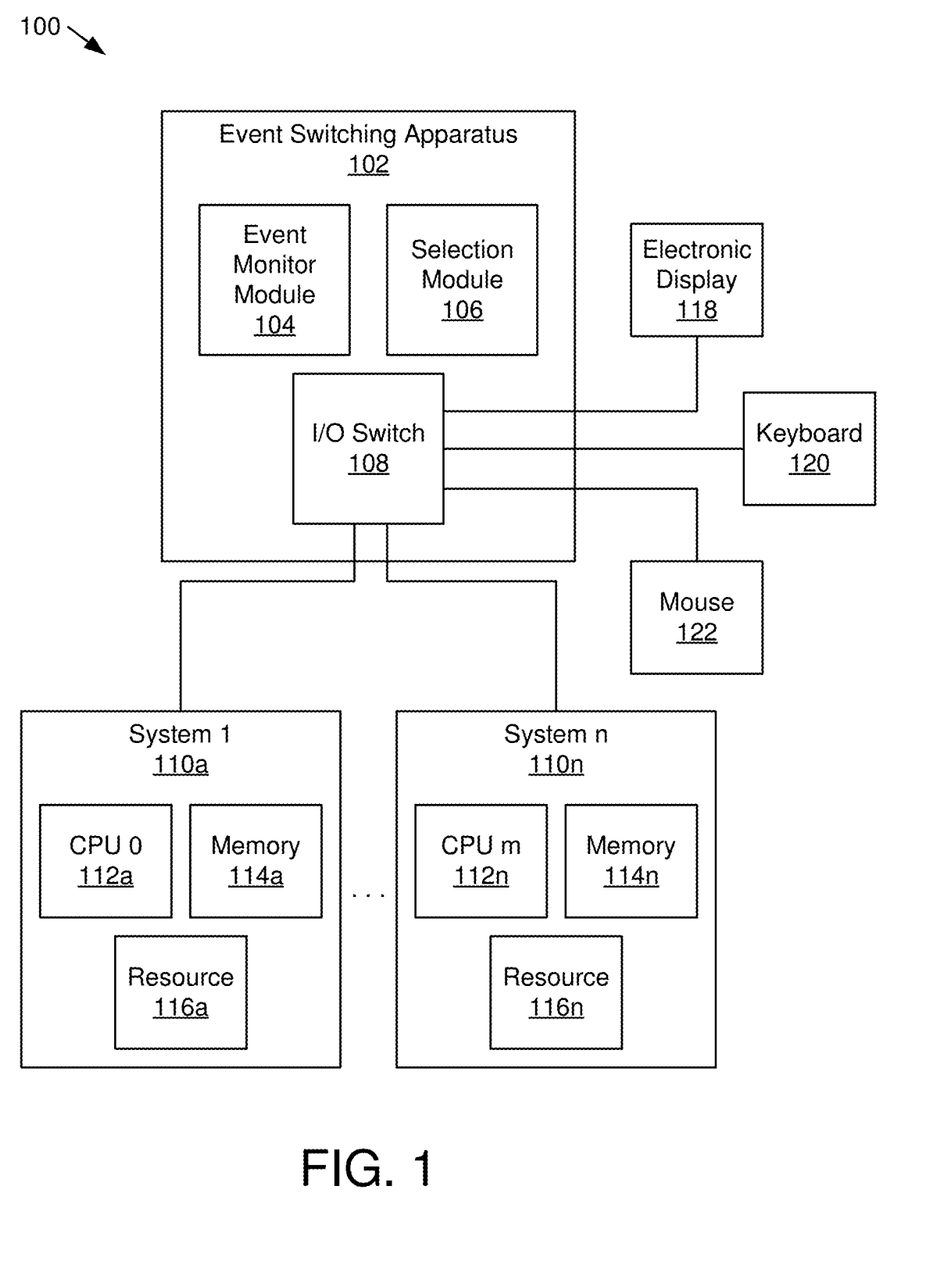
FIG. 1 is a schematic block diagram illustrating a system for automatically switching input/output ("I/O") between partitioned systems based on system events, according to various embodiments.

FIG. 1 is a schematic block diagram illustrating a system 100 for automatically switching input/output ("I/O") between partitioned systems based on system events, according to various embodiments. The system 100 includes an event switching apparatus 102 with an event monitor module 104, a selection module 106, and an input/output ("I/O") switch 108. The system 100 includes systems 1-$n$ 110$a$-110$n$ (generically or collectively "110") where each system includes at least a central processing unit ("CPU") (labeled CPU 0 112$a$ to CPU m 112$n$, generically or collectively "112"). Each of the $n$ systems 110 may also include a variety of components, such as memory (e.g., 114$a$-114$n$) and other resources (e.g., 116$a$-116$n$) such as a non-volatile storage device, a graphical processing unit ("GPU"), an accelerator, another processor, a field programmable gate array ("FPGA"), and the like.

In some embodiments, the systems 110 are partitioned systems. In other embodiments, the systems 110 each include a motherboard. In some examples, each of the systems 110 are a separate computing device. In other embodiments, the systems 110 are created by partitioning a motherboard with multiple CPUs 112. In some embodiments, each of the plurality of systems 110 runs a different instance of an operating system ("OS").

Each of the plurality of systems 110 is connected to the I/O switch 108, which directs I/O signals to or receives signals from an I/O device, such as an electronic display 118, a keyboard 120, a mouse 122, etc. In some embodiments, the I/O switch 108 is a keyboard, video, mouse ("KVM") switch. The I/O switch 108, in some embodiments, includes various controllers, such as a GPU, a universal serial bus ("USB") controller, etc. In other embodiments, the I/O switch 108 switches I/O signals and another device includes I/O controllers, a GPU, etc.

The event switching apparatus 102 includes an event monitor module 104 configured to monitor a system state for each of two or more systems 110 sharing an electronic display 118 and/or an I/O device, where each of the two or more systems 110 includes a processor 112 executing an instance of an operating system. The event switching apparatus 102 also includes a selection module 106 configured to select a system (e.g., 110$a$) of the two or more systems 110 sharing the electronic display 118 and/or an I/O device in response to determining that a change has occurred in the system state of the of the selected system 110$a$.

In some embodiments, the event monitor module 104 receives system state information from the operating system of each system 110 where each of the two or more systems 110 include operating system monitoring, sensors, circuits, and other equipment, data structures, etc. capable of providing system state information. In some embodiments, system state information is in the form of a system event and the selection module selects a system (e.g., 110$a$) in response to the system event. A system event may include events related to hardware components, software, processes, or the like that is indicative of a change that has occurred in the system state of a system (e.g., 110$a$) of the two or more systems 110. In some embodiments, the system state information includes an error message, such as an error message sent to an event log.

In some embodiments, determining that there is a change in the system state includes detection of a monitored value exceeding a threshold. The monitored value may include a voltage, a current, a temperature, or the like. The monitored value may be from a power supply, a CPU, a compute node, a storage device, or any other device in a system 110 that includes an ability to monitor a parameter and compare the parameter to a threshold.

In other embodiments, determining that a change has occurred in the system state includes the event monitor module 104 receiving a notification associated with the operating system, such as read errors, write errors, process errors, a process execution malfunction, a warning regarding memory availability, or any other notification generated by an executing operating system. In some embodiments, the notification is a predictive failure alert ("PFA"). A predictive failure alert typically monitors one or more parameters and includes one or more thresholds representative of an indication that a failure of a component is likely to occur in the near future. In other embodiments, the notification is of a failure of a hardware component of a system (e.g., 110$a$) of the two or more systems 110.

In other embodiments, the notification is of an input/output error associated with input/output signals of a selected system 110$a$. In other embodiments, the notification is of a processing error associated with a processor of the selected system 110$a$. In other embodiments, the notification is of a crossing of a threshold where the crossing of the threshold is indicative of a problem within the selected system 110$a$.

In some embodiments, the event monitor module 104 monitors sensors, data lines, etc. that are specifically placed for use by the event monitor module 104. In some embodiments, the event monitor module 104 is configured to monitor various components of each system 110, such as the CPU 112, memory 114, each resource 116, etc. In some embodiments, the event monitor module 104 monitors system events of one or more workloads running on each of the two or more systems 110.

In some embodiments, the event monitor module 104 reports system events as they occur. In other embodiments, the event monitor module 104 reports system events within a window of time. In other embodiments, the event monitor module 104 or operating system counts certain events and reports the events when a count reaches a threshold during the window of time. In other embodiments, the event monitor module 104 stores system events in memory, which may be volatile memory or non-volatile memory. In other embodiments, the event monitor module 104 overwrites system events outside of the window of time.

In some embodiments, the event monitor module 104 interacts with the OS of each system 110 to collect system state data. In other embodiments, the event monitor module 104 uses circuits, data, etc. separate from the OS of a system 110 to collect system state data. In some embodiments, the event monitor module 104 monitors the system state of the two or more systems 110 using firmware running on the two or more systems 110.

In some examples, the event monitor module 104 interacts with a Unified Extensible Firmware Interface ("UEFI") firmware or Basic Input/Output System ("BIOS") boot firmware. UEFI firmware and BIOS boot firmware support a compute node or other computing device at a low level and help boot an operating system, monitor functions, processes, etc. UEFI is a publicly available specification that defines a software interface between an operating system and platform firmware and replaces legacy BIOS boot firmware. UEFI, and to a lesser degree BIOS, support remote diagnostics and repair of computing devices with or without an operating system.

In other embodiments, the event monitor module 104 monitors the system state of each of the two or more systems 110 using a management controller of a compute node or similar computing device. The management controller, in some embodiments, is connected to a management server over a management network. In some embodiments, the management controller includes a baseboard management controller ("BMC"). In other embodiments, the management controller is a datacenter secure control module ("DC-SCM"), which is discussed in detail below. In some embodiments, the event monitor module 104 monitors one or more components of each of the two or more systems 110. In other embodiments, the event monitor module 104 monitors a portion of each of the two or more systems 110. One of skill in the art will recognize other ways for the event monitor module 104 to monitor for system events of each of the two or more systems 110.

In some embodiments, the processes, components, etc. to be monitored as well as what changes occur to cause selection of a system (e.g., 110a) are configurable by a user via a graphical user interface. In other embodiments, the event switching apparatus 102 is configurable by a user to set thresholds and the selection module 106 is configurable to set logic, a hierarchy, etc. for the various thresholds. In other embodiments, the graphical user interface allows a user to determine which components, processes, workloads, etc. to monitor for system state information. One of skill in the art will recognize other thresholds, notifications, error messages, etc. to be monitored by the event monitor module 104 and used by the selection module 106.

The event switching apparatus 102 includes the I/O switch 108 configured to switch in input of the I/O switch to send data for display of one or more elements of the selected system (e.g., 110a) to an electronic display, such as the electronic display 118 of FIG. 1. In some embodiments, the selection module 106 provides a signal to the I/O switch 108 to cause the I/O switch 108 to switch inputs so that the I/O switch connects the selected system 110a to the electronic display 118. In some embodiments, the I/O switch 108 is a KVM switch and the selection module 106 controls the KVM switch.

In some embodiments, the I/O switch 108 may select a system (e.g., 110b) of the two or more systems 110 to send data for display on the electronic display 118 upon startup. In embodiments described herein, this selection of a system upon startup of the I/O switch 108 is not intended to be the selection by the selection module 106. In embodiments described herein, monitoring the system state and determining that a change has occurred in the system state for each of the two or more systems 110 excludes a startup period of the I/O switch 108 where the I/O switch 108 selects an initial system (e.g., 110b) of the two or more systems 110 to send data for display. In some embodiments, the selection module 106 does not select a system (e.g., 110a) of the two or more systems 110 until operation after a startup period.

In other embodiments, the I/O switch 108 includes multiple connections for various I/O signals. In some embodiments, the I/O switch includes video connections in addition to other I/O signals, such as one or more universal serial bus ("USB") connectors for use with a keyboard 120, a mouse 122, a track pad, a stylus, speakers, etc. In some embodiments, the I/O switch 108 includes various input ports for connection to signal cables from the two or more systems 110 and includes device ports for the electronic display 118, keyboard 120, mouse 122, etc. In other embodiments, the event switching apparatus 102 includes an I/O switch 108 for each I/O device or each I/O device type. One of skill in the art will recognize other configurations of one or more I/O switches 108 controlled by the selection module 106.

Figure 2:
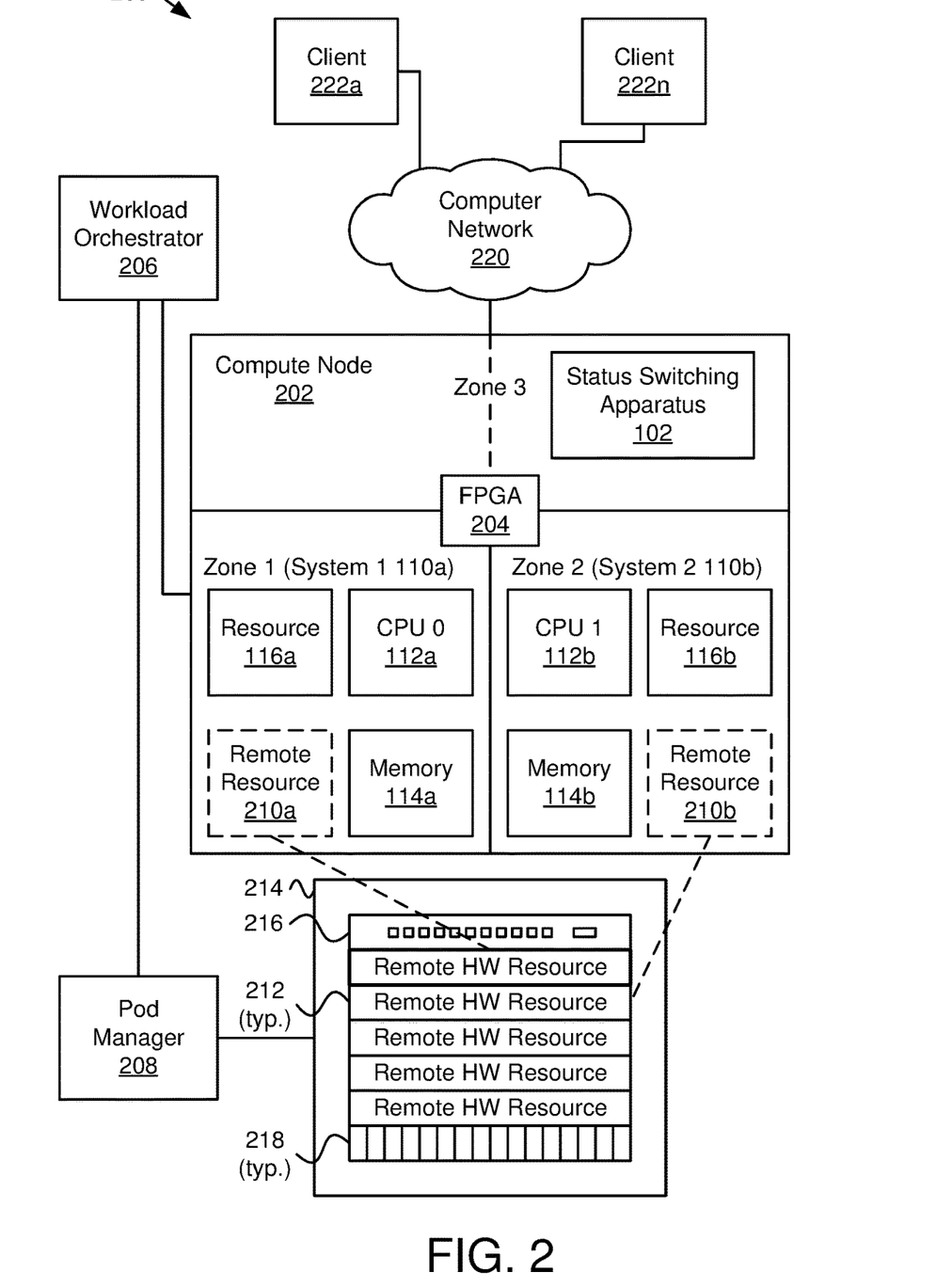
FIG. 2 is a schematic block diagram illustrating a system for automatically switching I/O between partitioned systems based on system events where the systems are in a partitioned compute node, according to various embodiments.

FIG. 2 is a schematic block diagram illustrating a system 200 for automatically switching I/O between partitioned systems 110 based on system events where the systems 110 are in a partitioned compute node 202, according to various embodiments. In some embodiments, the compute nodes 202 are in a composable system. The system 200 includes a compute node 202 with an event switching apparatus 102. The event switching apparatus 102 includes an event monitor module 104, a selection module 106, and an I/O switch 108 which are substantially similar to those described above in relation to the system 100 of FIG. 1. The event monitor 104, the selection module 106, and the I/O switch 108 are not shown for convenience but are included.

The event switching apparatus 102 is connected to two systems 110. In the depicted embodiments, there are two partitioned systems 110 labeled zone 1 (system 1 110a) and zone 2 (system 2 110b). Each system 110 includes a CPU 112, memory 114, and a resource 116 as in the system 100 of FIG. 1. The partitioned systems 110 may also include other installed resources. The compute node 202 also includes a zone 3, which includes the event switching apparatus 102. In some embodiments, zone 3 is partitionable into one or two parts, depending on whether or not I/O devices are separated to service each of system 1 110a and system 2 110b or if the I/O switch 108 is used to connect to a single system 110 at a time.

An FPGA 204, in some embodiments, facilitates partitioning the compute node 202 into systems. The FPGA 204, in some embodiments, partitions the compute node 202 so that each system 110 includes a CPU 112, memory 114, resources 116, etc. The FPGA 204, in some embodiments, configures the compute node 202 into a single system or removes partitions. In some embodiments, the FPGA 204 facilitates communication between the event switching apparatus 102 and the systems 110.

In some embodiments, a workload orchestrator 206 coordinates execution of workloads on partitioned systems 110 of one or more compute nodes 202. In some embodiments, the workload orchestrator 206 coordinates with the FPGA 204 to create partitioned systems that include virtual machines ("VMs"), containers, etc. for various clients 222a-222b (collectively or generically "222") in communication with the one or more compute nodes 202 and systems 110 over a computer network 220.

In some embodiments, the partitioned systems 110 may also include a remote resource 210a, 210b, which emulates a remote hardware resource 212 located external to the compute node 202. The remote hardware resources 212, in some embodiments are in a pod 214 that includes various remote resources 212, such as accelerators, FPGAs, storage devices 218, CPUs, GPUs, and the like. The pod 214 typically includes a switch 216 configured to connect the remote hardware resources 212 to compute nodes 202 as directed by a pod manager 208. The event monitor module 104 is configured, in some embodiments, to monitor system events of a remote hardware resource 212 that is emulated by a remote resource 210 of a system 110.

In some embodiments, the compute nodes 202 include multiple sockets that each accommodate a CPU 112 where each CPU 112 is supported by memory 114 and other components. A common configuration of a compute node 202 includes two sockets, as depicted in FIG. 2.

The compute nodes 202 communicate with clients 222 over a computer network 220 that may include a LAN, a WAN, a fiber network, a wireless connection, the Internet, etc. and may include multiple networks. The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM" ®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA" ®). Alternatively, the wireless connection may be a cellular telephone network communication. All standards and/or connection types include the latest version and revision of the standard and/or connection type as of the filing date of this application.

Figure 3:
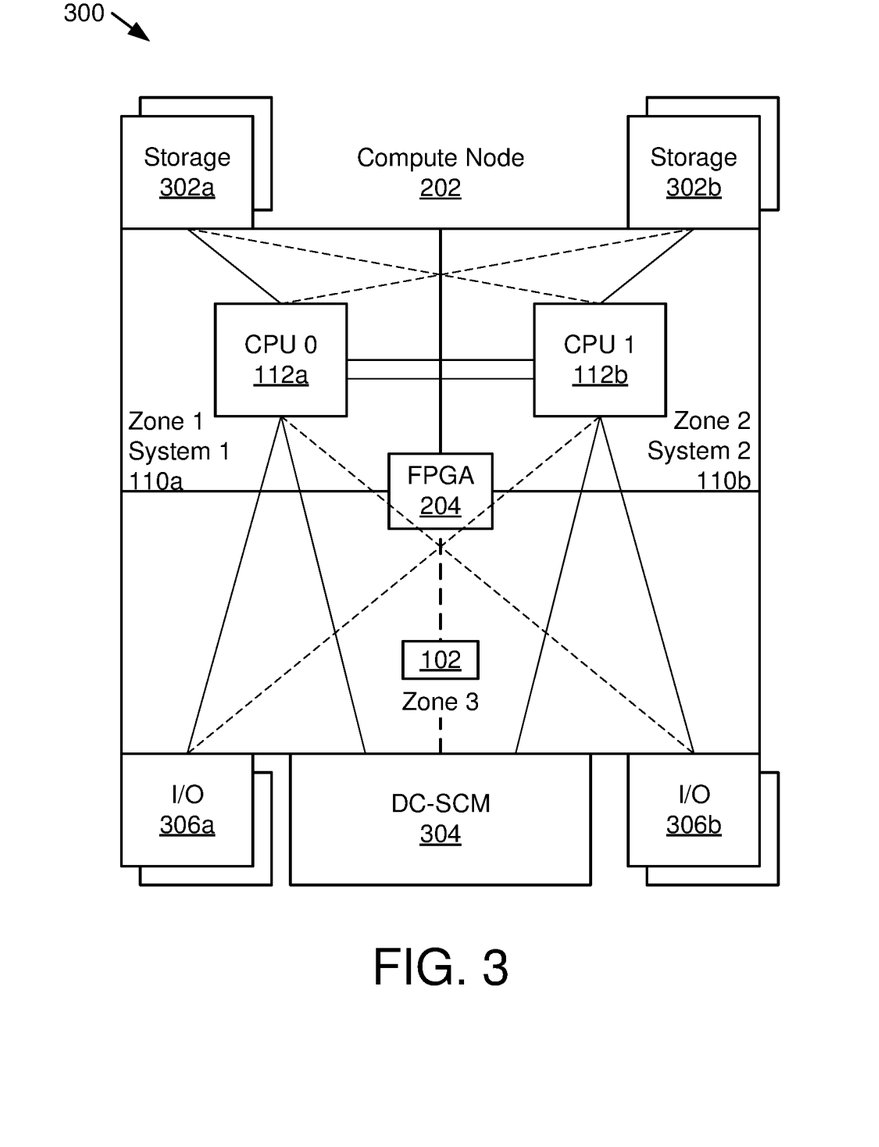
FIG. 3 is a schematic block diagram illustrating another system for automatically switching I/O between partitioned systems based on system events where the systems are in a partitioned compute node, according to various embodiments.

FIG. 3 is a schematic block diagram illustrating another system 300 for automatically switching I/O between partitioned systems 110 based on system events where the partitioned systems 110 are in a partitioned compute node 202, according to various embodiments. The system 300 includes two partitioned systems 110a, 110b, labeled zone 1 and zone 2, which are substantially similar to those described above in relation to the system 200 of FIG. 2. While each system 110a, 110b only depicts a CPU 112, memory 114, resources 116, etc. are included as needed or desired for a partition.

The compute node 202 also includes an event switching apparatus 102, which is substantially similar to those described above in relation to the systems 100, 200 of FIGS. 1 and 2. The system 300 of FIG. 3 includes a datacenter secure compute module ("DC-SCM") 304. The DC-SCM is a management controller compliant with an open source specification. The DC-SCM 304 complies with a DC-SCM specification, such as the DC-SCM 2.0 specification. The DC-SCM 304 includes a baseboard management controller ("BMC") and is connected to a management network. Typically, a DC-SCM 304 includes a BMC plus other supporting components, such as memory, buses, bus controllers, a GPU, and the like. In some embodiments, the DC-SCM 304 is a card in a dedicated slot on a motherboard of the compute node 202 where the slot complies with a DC-SCM specification.

The management network, in some embodiments, is a network different than the computer network 220 used for communication with clients, for communication of data from workloads running on the compute nodes 202, etc. In other embodiments, the management network uses a same computer network 220 as is used for data from workloads but runs securely.

In some embodiments, the event switching apparatus 102 is distributed between a motherboard of the compute node 202 and the DC-SCM 304. In some examples, one or more I/O switches 108 are on the motherboard and the event monitor module 104 and the selection module 106 are in the DC-SCM 304. In other embodiments, components 104, 106, 108 of the event switching apparatus 102 are distributed differently.

In the embodiments of FIG. 3, the compute node 202 is connected to other devices, such as storage 302a, 302b, I/O devices 306a, 306b, which may be installed through cables, in slots, etc. The storage 302, I/O devices 306, etc., in some embodiments, are situated to service each CPU 112 when partitioned. In other embodiments, I/O devices, such as an electronic display 118, keyboard 120, mouse 122, etc. are connected through the DC-SCM 304, either locally or remotely, to provide system administrator access to the compute node 202 and systems 110 of the compute node 202.

Figure 4:
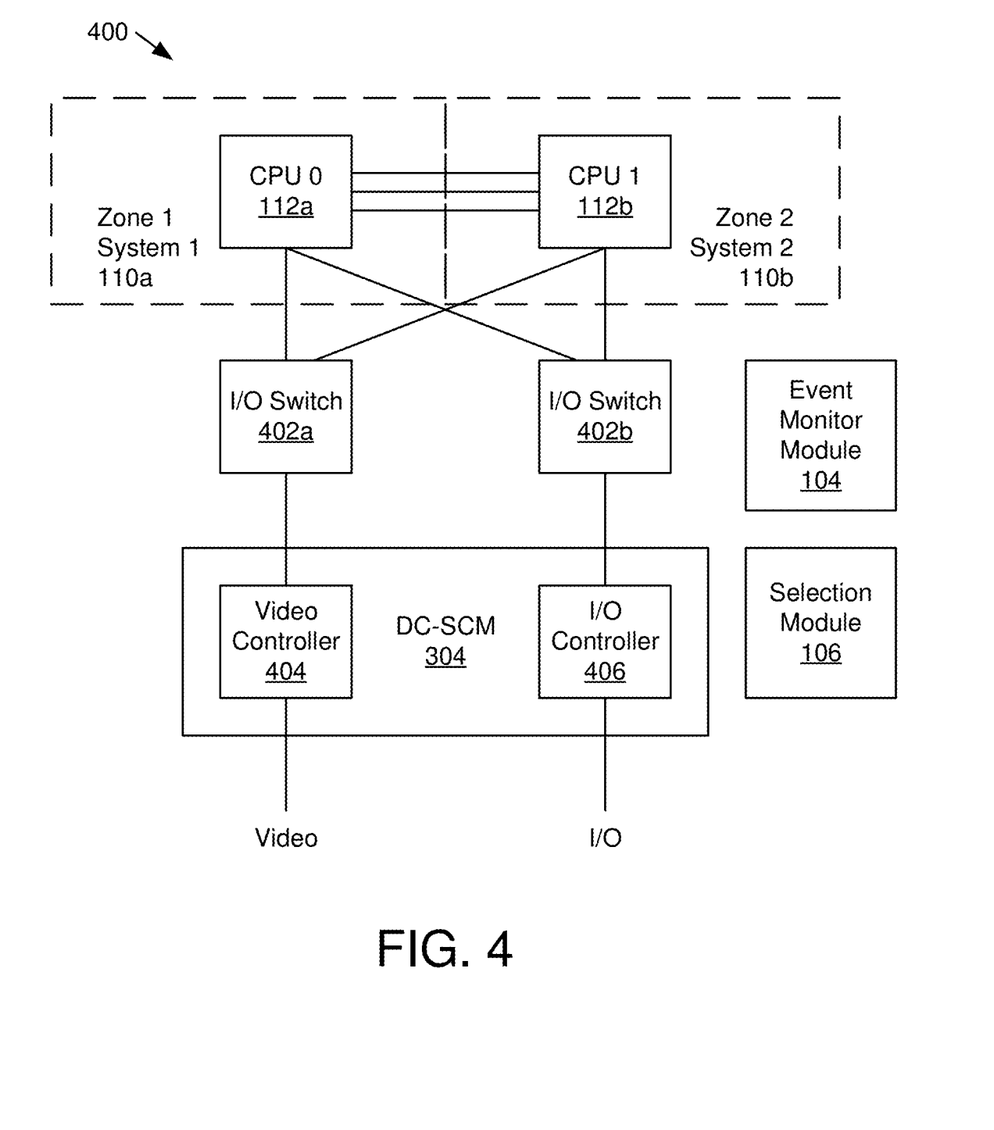
FIG. 4 is a schematic block diagram illustrating an alternate view of a system for automatically switching I/O between partitioned systems based on system events where the systems are in a partitioned compute node, according to various embodiments.

FIG. 4 is a schematic block diagram illustrating an alternate view of a system 400 for automatically switching I/O between partitioned systems 110 based on system events where the systems 110 are in a partitioned compute node 202, according to various embodiments. In the embodiments of FIG. 4, the CPUs 112a, 112b of two systems 110a, 110b are depicted. The systems 110a, 110b include various other components that have been partitioned into the systems 110a, 110b, such as memory 114, resources 116, etc. FIG. 4 depicts a first I/O switch 402a and a second I/O switch 402b. The first I/O switch 402a is connected to a video controller 404 in a DC-SCM 304. In some embodiments, the video controller 404 provides video signals from one of the two systems (e.g., 110a) to an electronic display 118. In some embodiments, the video controller 404 is a GPU. In other embodiments, the video controller provides an output in a specific format, such as DisplayPort, High-Definition Multimedia Interface ("HDMI"), and the like.

The second I/O switch 402b is connected to an I/O controller 406 of the DC-SCM 304. In some embodiments, the I/O controller 406 is a USB controller. In other embodiments, the I/O controller 406 supports other port types, such as PS/2 ports, serial ports, Bluetooth®, Zigbee®, and the like. While a single I/O controller 406 is included in the DC-SCM 304 of FIG. 4, other embodiments include additional I/O controllers 406 of various types or of the same type. Each I/O controller 406 connects to one or more I/O devices, such as a keyboard 120, a mouse 122, a stylus, a track pad, or the like.

In some embodiments, the first and second I/O switches are Peripheral Component Interconnect Express ("PCIe") devices that function like a multiplexer ("MUX") to connect each of the two or more systems 110 to the appropriate controller (e.g., 404, 406). In other embodiments, other types of devices are used for the I/O switches 402 that are capable of connecting signals from the systems 110 to the controllers 404, 406.

The system 400 of FIG. 4 includes an event monitor module 104 and a selection module 106, which may be in the DC-SCM 304, on the motherboard of the compute node 202, or the like.

Figure 5:
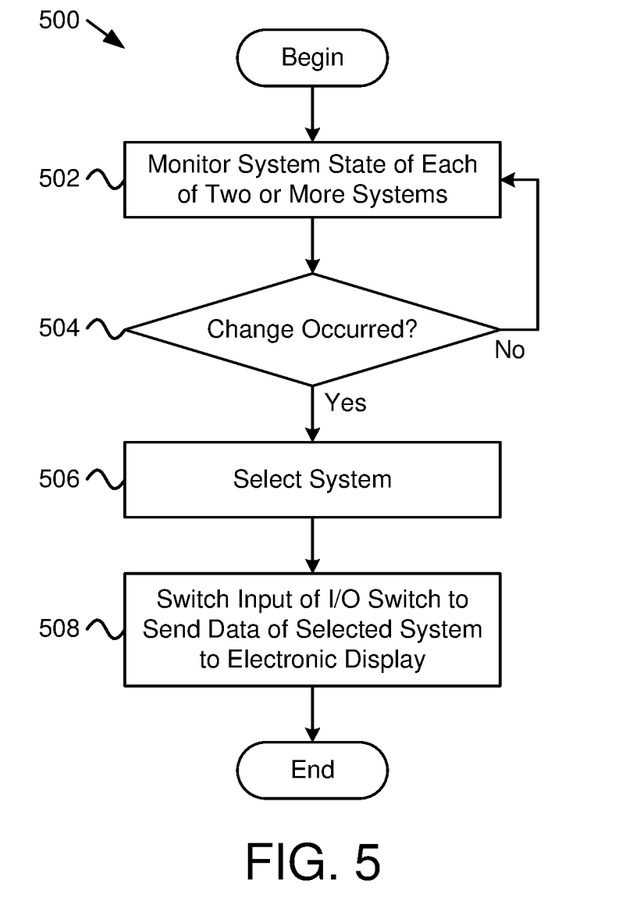
FIG. 5 is a schematic flow chart diagram illustrating a method for automatically switching I/O between partitioned systems based on system events, according to various embodiments.

FIG. 5 is a schematic flow chart diagram illustrating a method 500 for automatically switching I/O between partitioned systems 110 based on system events, according to various embodiments. The method 500 begins and monitors 502 a system state for each of two or more systems 110 and determines 504 whether a change has occurred to the system state of a system (e.g., 110*a*) of the two or more systems 110. Each of the two or more systems 110 includes a processor 112 executing an instance of an operating system If the method 500 determines 504 that a change has not occurred to the system state of a system (e.g., 110*a*) of the two or more systems 110, the method 500, returns and monitors 502 the system state of the two or more systems 110.

If the method 500 determines 504 that a change has occurred to the system state of a system (e.g., 110*a*) of the two or more systems 110, the method 500 selects 506 the system 110*a* where the system state has changed and switches 508 an I/O switch 108 to send data for display of one or more elements of the selected system 110*a* to an electronic display 118, and the method 500 ends. The method 500 determining 504 that a change has occurred in the system state of the system 110*a* includes receiving a notification of a system event in the system 110*a*. In various embodiments, all or a portion of the method 500 is implemented using the event monitor module 104, the selection module 106, and/or the I/O switch 108.

Figure 6:
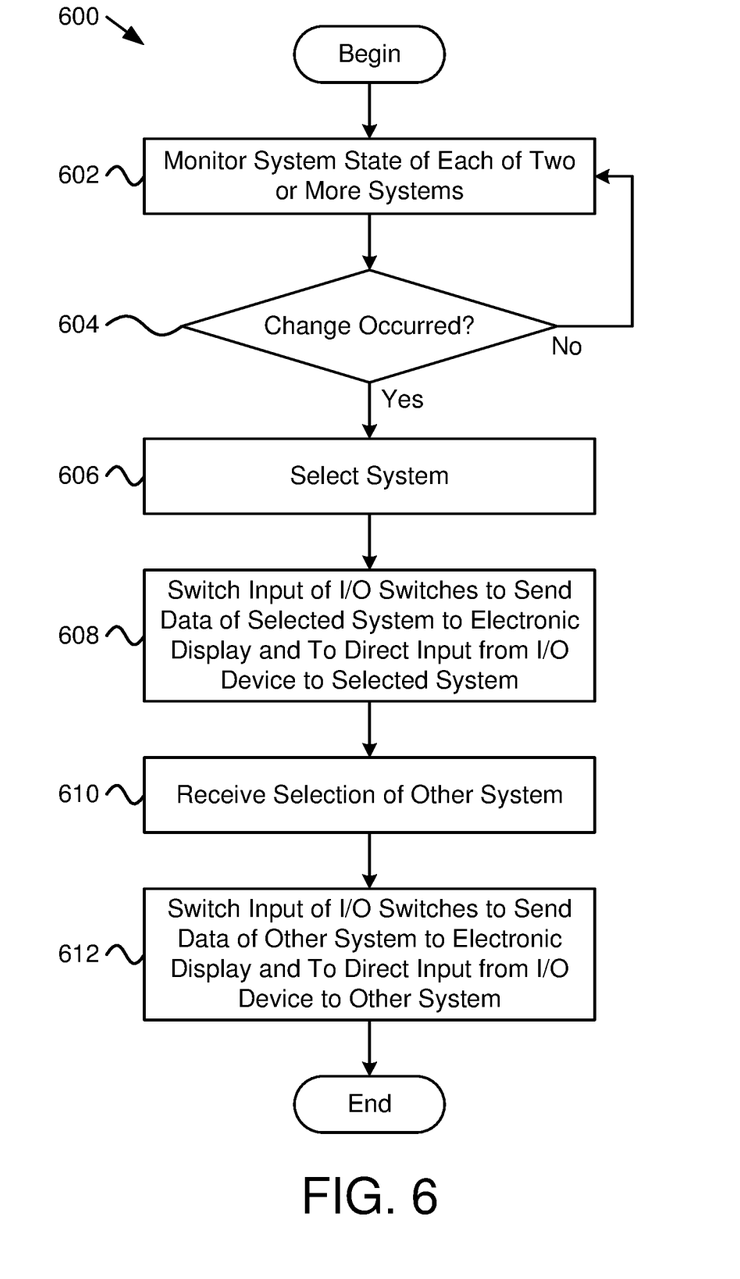
FIG. 6 is a schematic flow chart diagram illustrating another method for automatically switching I/O between partitioned systems based on system events, according to various embodiments.

FIG. 6 is a schematic flow chart diagram illustrating another method 600 for automatically switching I/O between partitioned systems 110 based on system events, according to various embodiments. The method 600 begins and monitors 602 a system state for each of two or more systems 110 and determines 604 whether a change has occurred to the system state of a system (e.g., 110*a*) of the two or more systems 110. Each of the two or more systems 110 includes a processor 112 executing an instance of an operating system If the method 600 determines 604 that a change has not occurred to the system state of a system (e.g., 110*a*) of the two or more systems 110, the method 600, returns and monitors 602 the system state of the two or more systems 110.

If the method 600 determines 604 that a change has occurred to the system state of a system (e.g., 110*a*) of the two or more systems 110, the method 600 selects 606 the system 110*a* where the system state has changed and switches 608 one or more I/O switches 108 to send data for display elements of the selected system 110*a* to an electronic display 118 and one or more I/O devices, such as a keyboard 120, mouse 122, etc. In some embodiments, the I/O switch 108 includes multiple drivers, controllers, etc. to accommodate video signals as well as I/O device signals. In other embodiments, the method 600 switches inputs of two or more I/O switches 108, as depicted in FIG. 4.

The method 600 receives 610 a selection, at some point, of a system (e.g., 110*b*) from a user, system administrator, etc. and switches 612 one or more I/O switches 108 to send data for display elements of the selected system 110*a* to an electronic display 118 and the one or more I/O devices, and the method 600 ends. User input to select a system 110 may be received before or after automatic selection of a system 110*a* based on a change in a system state. In various embodiments, all or a portion of the method 600 is implemented using the event monitor module 104, the selection module 106, and/or the I/O switch 108.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    monitoring a system state for each of two or more systems sharing an electronic display, wherein each of the two or more systems comprises a processor executing an instance of an operating system, wherein monitoring the system state for each of the two or more systems comprises monitoring system state information available from the instance of the operating system of each of the two or more systems;
    selecting a system of the two or more systems sharing the electronic display in response to determining that a change has occurred in the system state of the of the selected system; and
    switching an input of an input/output ("I/O") switch to send data for display of one or more elements of the selected system to the electronic display.

2. The method of claim 1, wherein determining the change in the system state of the selected system comprises receiving a notification of the change of the system state.

3. The method of claim 2, wherein the notification comprises:
    a notification of a predicted failure of a hardware component in the selected system;
    a notification of a failure of a hardware component of the selected system;
    a notification of an input/output error associated with input/output signals of the selected system;
    a notification of a processing error associated with a processor of the selected system; and/or
    a notification of a crossing of a threshold, the crossing of the threshold indicative of a problem within the selected system.

4. The method of claim 1, wherein monitoring the system state for each of the two or more systems sharing the electronic display comprises monitoring the system state using:
    firmware running on each of the two or more systems; and/or
    a management controller of a compute node, the management controller connected to a management server over a management network.

5. The method of claim 1, wherein monitoring the system state for each of the two or more systems sharing the electronic display comprises monitoring:

one or more executing workloads on each of the two or more systems;

a portion of each of the two or more systems; and/or one or more components of each of the two or more systems.

6. The method of claim 1, wherein the two or more systems are on a compute node, wherein the compute node is partitioned into the two or more systems.

7. The method of claim 1, wherein the I/O switch comprises a keyboard, video, and mouse ("KVM") switch in a management controller of a compute node, the management controller connected to a management server over a management network.

8. The method of claim 7, wherein the management controller comprises datacenter-ready secure control module ("DC-SCM").

9. The method of claim 1, wherein monitoring the system state for each of the two or more systems sharing the electronic display excludes a startup period of the I/O switch comprising the I/O switch selecting an initial system of the two or more systems to send data for display.

10. An apparatus comprising:

an event monitor module configured to monitor a system state for each of two or more systems sharing an electronic display, wherein each of the two or more systems comprises a processor executing an instance of an operating system, wherein monitoring the system state for each of the two or more systems comprises monitoring system state information available from the instance of the operating system of each of the two or more systems;

a selection module configured to select a system of the two or more systems sharing the electronic display in response to determining that a change has occurred in the system state of the of the selected system; and an input/output ("I/O") switch configured to switch an input of the I/O switch to send data for display of one or more elements of the selected system to the electronic display, wherein said modules comprise one or more of hardware circuits, a programmable storage device, and/or code executable by a processor, the code stored on non-transitory computer readable storage media.

11. The apparatus of claim 10, wherein determining the change in the system state of the selected system comprises receiving a notification of the change of the system state.

12. The apparatus of claim 11, wherein the notification comprises:

a notification of a predicted failure of a hardware component in the selected system;

a notification of a failure of a hardware component of the selected system;

a notification of an input/output error associated with input/output signals of the selected system;

a notification of a processing error associated with a processor of the selected system; and/or a notification of a crossing of a threshold, the crossing of the threshold indicative of a problem within the selected system.

13. The apparatus of claim 10, wherein the event status monitor module monitoring the system state for each of the two or more systems sharing the electronic display comprises monitoring the system state using:

firmware running on each of the two or more systems; and/or a management controller of a compute node, the management controller connected to a management server over a management network.

14. The apparatus of claim 10, wherein monitoring the system state for each of the two or more systems sharing the electronic display comprises monitoring:

one or more executing workloads on each of the two or more systems;

a portion of each of the two or more systems; and/or one or more components of each of the two or more systems.

15. The apparatus of claim 10, wherein the two or more systems are on a compute node, wherein the compute node is partitioned into the two or more systems.

16. The apparatus of claim 10, wherein the I/O switch comprises a keyboard, video, and mouse ("KVM") switch and/or is in a management controller of a compute node, the management controller connected to a management server over a management network.

17. The apparatus of claim 16, wherein the management controller comprises a datacenter-ready secure control module ("DC-SCM").

18. The apparatus of claim 10, further comprising two or more I/O switches, wherein:

a first I/O switch is configured to send the display of the one or more elements of the selected system to the electronic display; and/or a second I/O switch is configured to connect an I/O controller receiving data from an I/O device to the selected system.

19. The apparatus of claim 10, wherein monitoring the system state for each of the two or more systems sharing the electronic display excludes a startup period of the I/O switch comprising the I/O switch selecting an initial system of the two or more systems to send data for display.

20. A compute node comprising:

two or more systems sharing an electronic display and an I/O device, each of the two or more systems comprising a processor executing an instance of an operating system, wherein the compute node is partitioned into the two or more systems;

an event status monitor module configured to monitor a system state for each of the two or more systems sharing the electronic display and the I/O device, wherein monitoring the system state for each of the two or more systems comprises monitoring system state information available from the instance of the operating system of each of the two or more systems;

a selection module configured to select a system of the two or more systems sharing the electronic display in response to determining that a change has occurred in the system state of the of the selected system; and a keyboard, video, and mouse ("KVM") switch configured to switch an input of the KVM switch to send data for display of one or more elements of the selected system to the electronic display and to connect an I/O controller receiving data from the I/O device to the selected system, wherein said modules comprise one or more of hardware circuits, a programmable storage device, and/or code executable by a processor, the code stored on non-transitory computer readable storage media.

* * * * *